US012808263B2

(12) United States Patent

Lauer et al.

(10) Patent No.: US 12,808,263 B2
(45) Date of Patent: Nov. 24, 2026

(54) STAIR SYSTEM FOR A WORKING MACHINE, WORKING MACHINE

(71) Applicant: Volvo Construction Equipment AB, Eskilstuna (SE)

(72) Inventors: Kai Lauer, Losheim am See (DE); Peter Bauer, Morbach (DE); Thomas Schaefer, Trier (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 604 days.

(21) Appl. No.: 18/214,633

(22) Filed: Jun. 27, 2023

(65) Prior Publication Data

US 2024/0003187 A1 Jan. 4, 2024

(30) Foreign Application Priority Data

Jun. 30, 2022 (EP) .................................... 22182340

(51) Int. Cl.

*E06C 5/04* (2006.01)
*E06C 5/34* (2006.01)

(52) U.S. Cl.

CPC . *E06C 5/04* (2013.01); *E06C 5/34* (2013.01)

(58) Field of Classification Search

CPC ... E06C 5/04; E06C 1/383; E06C 5/24; B60R 3/02

USPC .......................................................... 182/127

See application file for complete search history.

(56) References Cited

U.S. PATENT DOCUMENTS

| | | | | |
|---|---|---|---|---|
| 6,179,312 | B1 | 1/2001 | Paschke et al. | |
| 6,315,078 | B1 * | 11/2001 | Kumher .................... | E06C 9/12 182/39 |
| 9,649,984 | B2 | 5/2017 | Edelen et al. | |
| 9,994,159 | B2 | 6/2018 | Giesmann | |
| 2005/0028320 | A1 * | 2/2005 | Latimer ................ | E04F 11/064 16/231 |
| 2006/0011416 | A1 | 1/2006 | Gonzalez y Gil et al. | |
| 2009/0065301 | A1 * | 3/2009 | Ellement ............... | E02F 9/0833 182/127 |

(Continued)

FOREIGN PATENT DOCUMENTS

| | | |
|---|---|---|
| DE | 202013001302 U1 | 3/2013 |
| DE | 102012216307 B3 | 1/2014 |

(Continued)

OTHER PUBLICATIONS

Extended European Search Report for European Patent Application No. 22182340.4, mailed Dec. 23, 2022, 7 pages.

*Primary Examiner* — Zoe Tam Tran
(74) *Attorney, Agent, or Firm* — Sage Patent Group

(57) ABSTRACT

A stair system for a working machine having an upper carriage and a lower carriage pivotable against each other includes a foldable ladder movable between an upper end position and a lower end position, wherein in the upper end position the ladder is arrangeable at the working machine in a way that moving and pivoting of the working machine is not disturbed and wherein in the lower end position the ladder is able to provide access to the upper carriage, such as to a cabin, of the working machine; a control system comprising at least one alignment sensor indicating alignment of the upper and lower carriage and a controller which is able to block or enable a movement of the foldable ladder based on an output of the alignment sensor.

15 Claims, 5 Drawing Sheets

(56) References Cited

U.S. PATENT DOCUMENTS

| | | | | |
|---|---|---|---|---|
| 2009/0294213 | A1* | 12/2009 | Kim | E06C 5/08 182/127 |
| 2012/0205195 | A1 | 8/2012 | Tsutsumi et al. | |
| 2014/0048352 | A1 | 2/2014 | Takenawa et al. | |
| 2016/0101739 | A1 | 4/2016 | Edelen et al. | |
| 2017/0144604 | A1 | 5/2017 | Doy | |
| 2017/0145746 | A1* | 5/2017 | Meyen | E06C 5/04 |
| 2017/0246992 | A1 | 8/2017 | Giesmann | |
| 2017/0327046 | A1 | 11/2017 | Uemura et al. | |

FOREIGN PATENT DOCUMENTS

| | | | |
|---|---|---|---|
| DE | 102020113952 | A1 | 12/2020 |
| EP | 2481275 | A1 | 8/2012 |
| EP | 1774131 | B1 | 11/2013 |
| EP | 3578720 | A1 | 12/2019 |
| JP | 2000328601 | A | 11/2000 |
| RU | 2011104979 | A | 8/2012 |
| WO | 2006036279 | A1 | 4/2006 |
| WO | 2007062464 | A1 | 6/2007 |
| WO | 2011100794 | A1 | 8/2011 |
| WO | 2013103456 | A1 | 7/2013 |
| WO | 2015051409 | A1 | 4/2015 |
| WO | 2017100272 | A1 | 6/2017 |

* cited by examiner

STAIR SYSTEM FOR A WORKING MACHINE, WORKING MACHINE

CROSS REFERENCE TO RELATED APPLICATION

This application claims foreign priority to European Application No. 22182340.4 filed on Jun. 30, 2022, the disclosure and content of which is incorporated by reference herein in its entirety.

TECHNICAL FIELD

The disclosure relates to a stair system for a working machine, especially for a working machine having an upper and a lower carriage pivotable against each other and to a working machine with a stair system.

The disclosure can be applied in all vehicles having an upper and a lower carriage pivotable against each other, such as excavator and harvester. Although the disclosure will be described with respect to an excavator, the disclosure is not restricted to this particular vehicle, but may also be used in other vehicles such as harvesters or truck cranes.

BACKGROUND

Current access system to the cabins of working machines like excavators are normally designed in accordance with standard ISO 2867. Nevertheless known access systems for working machines with pivotable upper and lower carriage using several steps integrated in parts of the working machine are very non-ergonomic and require a certain degree of mobility of the person to get on and off safely.

For working machines with fixed cabins stair systems with ladders fixed at a side of the working machine are described as for example in U.S. Pat. Nos. 9,649,984 B2 and 9,994,159 B2

SUMMARY

An object of the disclosure is to provide a stair system for a working machine having an upper and a lower carriage pivotable against each other, which stair system provides an improvement of the safety ascent to and descent of the working machine, especially to a cabin of the working machine arranged at the upper carriage.

The object is achieved by a stair system according to claim 1. Namely the stair system for a working machine having an upper and a lower carriage pivotable against each other according to the disclosure comprises a foldable ladder movable between an upper end position and a lower end position, wherein in the upper end position the ladder is arrangeable at the working machine in a way that moving and pivoting of the working machine is not disturbed and wherein in the lower end position the ladder is able to provide access to the upper carriage, such as to a cabin, of the working machine. Furthermore the stair system comprises a control system with at least one alignment sensor indicating alignment of the upper and lower carriage and with a controller which is able to block or enable a movement of the foldable ladder based on an output of the alignment sensor.

The disclosure is based on the recognition that by the provision of a stair system which comprises a foldable ladder, which in the upper end position does not disturb pivoting and moving the working machine the access to the upper carriage and especially a cabin installed at the upper carriage can be widely improved compared to known system.

The disclosure further includes the recognition that for a safe ascent and descent to the upper carriage and a safe working of the working machine it is further necessary to control the movement of the foldable ladder based on an information of alignment of the upper and lower carriage. In some examples, only if both are aligned to each other or just rotated several degrees to each other, the controller enables a movement of the foldable ladder. If the upper and the lower carriage are rotated more than a predetermined range to each other, for example 20 degrees to each other the controller will block a movement of the foldable ladder.

The stair system may be retrofittable. It is further contemplated that the stair system may be installed in a way that it does not affect the existing ladder system, which can always be used manually as it is electricity and control independent.

According to one embodiment, the upper end position is between the upper and lower carriage, once the ladder is arranged at the working machine. Hereby the ladder is stored between the upper and lower carriage and thus does not only not disturb the movement or pivoting of the working machine but also does not stick out from the working machine and thus is stored with improved safety.

According to a further embodiment the foldable ladder is arranged in horizontal position in the upper end position, when the stair system is arranged at the working machine and thus storing of the ladder is further improved.

According to a further embodiment in the lower end position the foldable ladder has an angle in the range of 10 to 30° to a vertical direction of the working machine and/or wherein a turning radius of the ladder is not larger than a turning radius of a door of the working machine. This allows for a very ergonomic ascent and descent and also for an arrangement of the ladder in the lower end position which does not disturb working or passing near the working machine. The ladder may be arranged within the width of a door of the cabin to further improve the ergonomic ascent and descent.

According to a further embodiment one ladder stringer is pivotably connectable to the working machine via a hinge and the ladder may have foldable steps. With this embodiment the stair system can be constructed with enhanced space and material savings.

The foldable ladder may include a folding construction having two centres of rotation. With such a folding construction a comfortable ladder with two ladder stringers can be used and easily stored in the upper end position without disturbing the working machine. It is then further contemplated that the foldable ladder may include a bearing fork which is pivotably connectable to the working machine and at which two ladder stringers are pivotably arranged, wherein the bearing fork may be pivotably connectable to a main bracket of the working machine. Especially with this embodiment with just one linear movement, the ascent/descent from a horizontal resting position in the upper end position by means of a turn-tilt movement, swivelling out 90° and thus realizing an ascent angle of approx. 20° to ensure an ergonomic one can be realized. Thus one centre of rotation is used for swivelling out the foldable ladder, the second one for tilting the ladder stringers with the steps.

According to a further embodiment the foldable ladder is arranged and constructed to be moved manually. Thus there is either no need for an automatic drive or a manually operation mode is provided for cases, in which an automatic drive does not function.

According to a further embodiment the stair system further comprises at least one movement sensor detecting a moving state of the working machine and/or at least one position sensor detecting a position of the foldable ladder and/or at least one surveillance sensor for space surveillance of a scope of the foldable ladder, wherein the controller is further able to block or enable a movement of the foldable ladder and/or the working machine based on an output of the movement sensor and/or the position sensor and/or the surveillance sensor. Thus the controller may be able to block a movement of the foldable ladder if the working machine is moving or the surveillance detector detects an obstacle in the monitored space. The controller may further be able to enable the movement of the foldable ladder if the working machine is not in motion and the monitored space is free of obstacles. Furthermore the controller may be able to block a pivoting and/or a movement of the working machine if the foldable ladder is not in the upper end position or if an obstacle in the monitored space is detected. Thus the safety of the stair system is further enhanced. In a further embodiment the controller is further able to receive a signal from a control unit of the working machine indicating a position of a control lockout lever of the working machine. In this embodiment the controller is able to block a movement of the foldable ladder if the control lockout lever is in an unlocked position, where working and travelling operations are possible and to enable movement if the control lockout lever is in a locked position wherein further control levers and pedals are locked to prevent inadvertent operation of the working machine.

According to a further embodiment the controller is further able to allow a pivoting of the upper carriage of the working up to a predetermined degree, for example up to 60 degree if the foldable ladder is in its lower position. This is helpful for certain use cases, for example during sewage works, when the operator intends to leave the cabin and has to bridge a ditch.

According to a further embodiment the stair system is an automatic stair system with a ladder drive system comprising at least one electrical or hydraulic, such as linearly extending, actuator and a coupling rod driving the foldable ladder. With this embodiment the ladder can be driven and controlled automatically. In some examples, the actuator is intelligent and can be controlled via Software and a CAN-Bus System.

According to a further embodiment the control system comprises at least one control element, such as a switch, to activate the ladder drive system, such as two control elements, of which one is arrangeable at a cabin of the working machine and the other one is arrangeable reachably from the ground. Thus the operator can activate the ladder drive system from either the cabin or from the ground.

According to a further embodiment the control system comprises a warning unit, which is able to output a warning signal to an operator if a movement of the foldable ladder and/or the working machine is blocked or enabled by the control system, wherein the warning signal may differ depending on the sensor output leading to the block of the respective movement. Thus the operator will get a notice from the control system if movement of the foldable or pivoting or moving of the working machine is blocked and the notice may also indicate what is the cause for the blocking.

For example, if the operator wants to fold out the foldable ladder and upper carriage is not aligned or the control lockout lever is unlocked, the notice could be “Align upper frame and lower the control lockout lever”. If the operator raises the control lockout lever while movable ladder is not in upper end position, the message could be “Lower Control Lockout Lever and fold in the movable ladder”.

According to a further embodiment the stair system further comprises an acoustic signaller, which is controlled via the controller and which is turned on during a movement of the foldable ladder.

According to a further embodiment an actuator sensor for a status of the electrical or hydraulic actuator and wherein the control system is further able to block or enable a movement of the foldable ladder based on an output of the actuator sensor. Thus if a malfunction of the actuator is indicated movement of the foldable ladder can be blocked.

According to a further embodiment the control system further comprise a telltale indicating a position of the foldable ladder. For example the signals from the telltale may be upper end position: no telltale; in-between position: yellow telltale, lower end position: green telltale and if a actuator status is not ok red telltale.

In a further embodiment the control system is able to initiate a move back of some degree or to its previous end position if a movement of the foldable ladder is blocked during fold in or fold out.

According to a further aspect of the disclosure the object is also achieved with a working machine having an upper and a lower carriage pivotable against each other with a stair system according to any of the embodiments described above. The working machine may by for example an excavator or a harvester or a truck crane.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings.

DETAILED DESCRIPTION OF EXAMPLE EMBODIMENTS OF THE DISCLOSURE

Figure 1A:
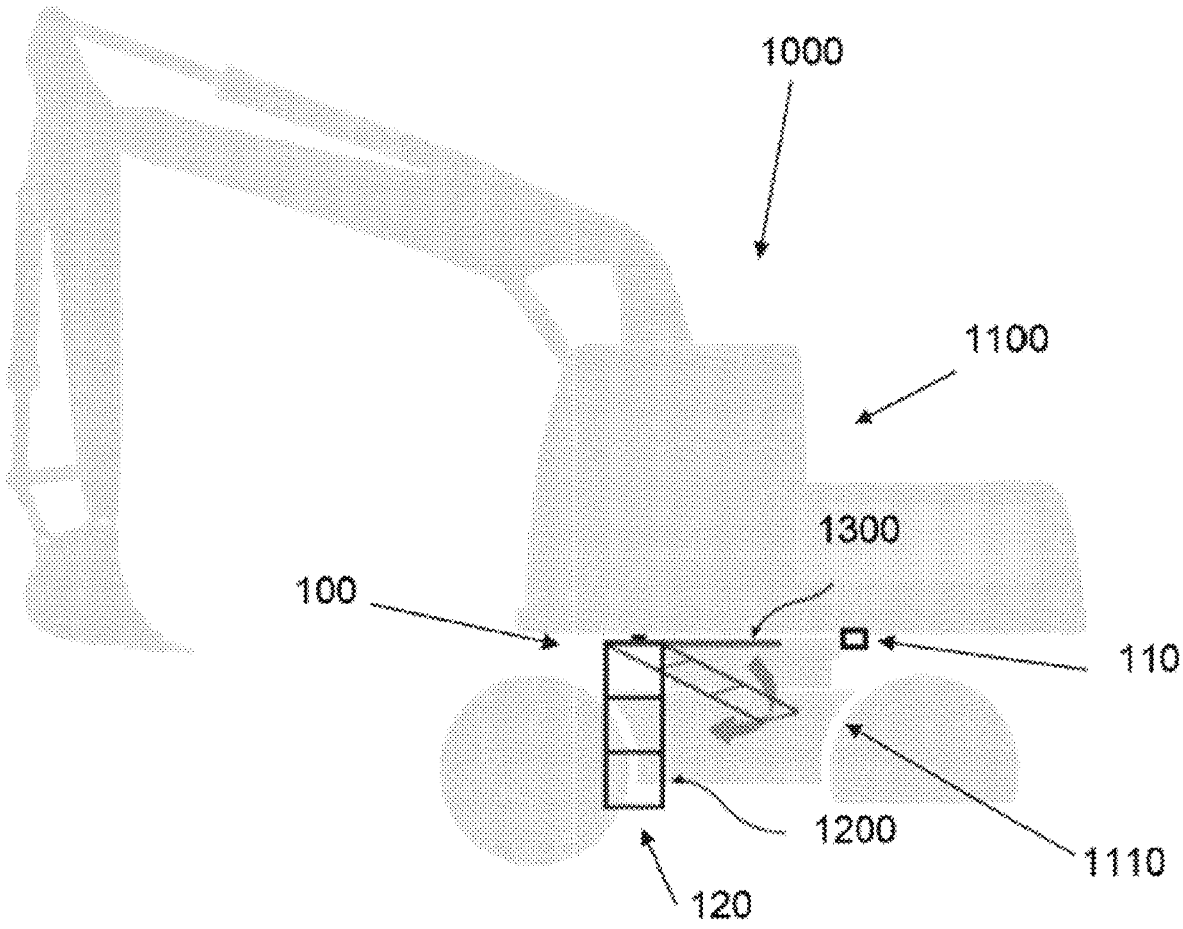
FIG. 1A is a schematic view of an excavator with a stair system according to an embodiment.

It is to be understood that the present disclosure is not limited to the embodiments described above and illustrated in the drawings; rather, the skilled person will recognize that many changes and modifications may be made within the scope of the appended claims.

Like reference character refer to like elements throughout the description.

FIG. 1A is a schematic view of an excavator 1000 with a stair system according to an embodiment. The excavator 1000 has an upper carriage 1100 and a lower carriage 1110 pivotable against each other. At the excavator 1000 a stair system 100 is arranged. The stair system 100 comprises a foldable ladder 120 movable between an upper end position 1300 and a lower end position 1200. In the upper end position 1300 the ladder is arranged at the working machine in a way that moving and pivoting of the working machine is not disturbed and in the lower end position the ladder provides access to a cabin of the working machine. The stair system further comprises a control system comprising at least one alignment sensor 110 indicating alignment of the upper and lower carriage and a controller which is able to block or enable a movement of the foldable ladder based on an output of the alignment sensor. The controller may be a separate controller or integrated within the machine controller. The upper end position 1300 in the shown embodiment is between the upper and lower carriage and the foldable ladder 120 is arranged in horizontal position in this upper end position.

One object of the stair system is to ensure that the operator can enter the cabin of the excavator more safely. The stair system is herein attached to an upper, movable platform and is brought into its lower end position 1200 in two rotation levels by means of an electric, linearly extending actuator 150 and a coupling rod (not shown). The foldable ladder may be operated via two separate control elements (not shown), such as switches, that enable operation from outside the working machine and from the cabin.

The shown stair system can be retrofitted also in addition to the existing ladder system of today's working machines and does not affect the existing ladder system, which can always be used manually as it is electricity independent as a back-up solution. If the upper platform is rotated several degrees to the lower, the ascent system may also be able to be operated and to guarantee safe ascent and descent from the cabin, depending on the settings of the controller and the space available at the respective working machine.

Figure 1B:
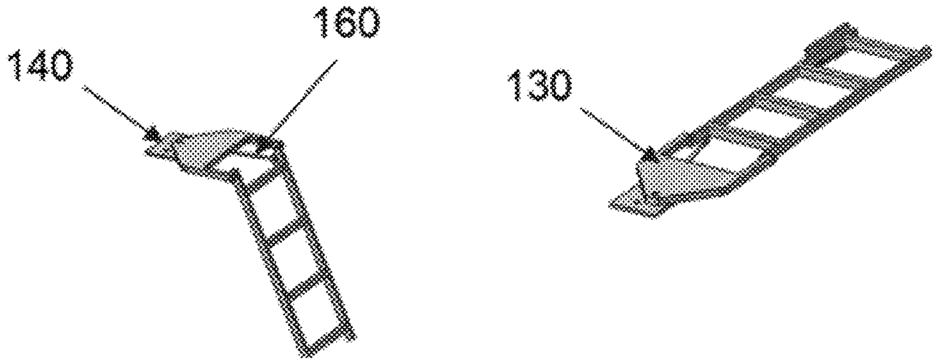
FIG. 1B is a detailed view of the stair system according of FIG. 1A.

FIG. 1B is a detailed view of the stair system according of FIG. 1A showing the foldable ladder 120 in the lower end position (left) and in the upper end position (right). In the lower end position the ladder has an angle in the range of 10 to 30° to a vertical direction of the working machine. In some examples, a turning radius of the ladder may be not larger than a turning radius of a door of the working machine. Thus even in the lower position the ladder does not affect passing by the working machine and the ascent or descent to the cabin is rendered more comfortable.

In the shown embodiment the foldable ladder comprises a bearing fork 130, which is pivotably connected to the working machine and at which two ladder stringers are pivotably arranged, wherein the bearing fork may be pivotably connectable to a main bracket 140 of the working machine. Thus the foldable ladder comprises a folding construction having two centres of rotation, one around which the bearing fork rotates to swivel out the bearing fork and the ladder stringers and the second one, around which the ladder stringers rotate to fold down.

The stair system here is an automatic stair system with a ladder drive system comprising one electrical linearly extending actuator (not shown here) and a coupling rod 150 driving the foldable ladder.

The stair system further comprises a movement sensor detecting a moving state of the working machine and a position sensor detecting a position of the foldable ladder and a surveillance sensor for space surveillance of a range of motion of the foldable ladder, wherein the controller is further able to block or enable a movement of the foldable ladder and/or the working machine based on an output of the movement sensor and/or the position sensor and/or the surveillance sensor. Thus the controller is able to block a movement of the foldable ladder if the working machine is moving or the surveillance detector detects an obstacle in the monitored space. The controller is further able to enable the movement of the foldable ladder if the working machine is not in motion and the monitored space is free of obstacles. Furthermore the controller is able to block a pivoting and/or a movement of the working machine if the foldable ladder is not in the upper end position or if an obstacle in the monitored space is detected. Thus the safety of the stair system is further enhanced. The controller is further able to receive a signal from a control unit of the working machine indicating a position of a control lockout lever of the working machine. In this embodiment the controller is thus able to block a movement of the foldable ladder if the control lockout lever is in an unlocked position, where working and travelling operations are possible and to enable movement if the control lockout lever is in a locked position wherein further control levers and pedals are locked to prevent inadvertent operation of the working machine. The stair system further may comprise an actuator sensor for a status of the electrical or hydraulic actuator and wherein the control system is further able to block or enable a movement of the foldable ladder based on an output of the actuator sensor.

In summary preconditions to fold in/out the foldable ladder are working machine not moving/pivoting, control lockout lever in locked position, alignment of upper and lower carriage and status of the actuator is ok.

The control system may further include a warning unit, which is able to output a warning signal to an operator if a movement of the foldable ladder and/or the working machine is blocked or enabled by the control system, wherein the warning signal may differ depending on the sensor output leading to the block of the respective movement.

Figure 2A:
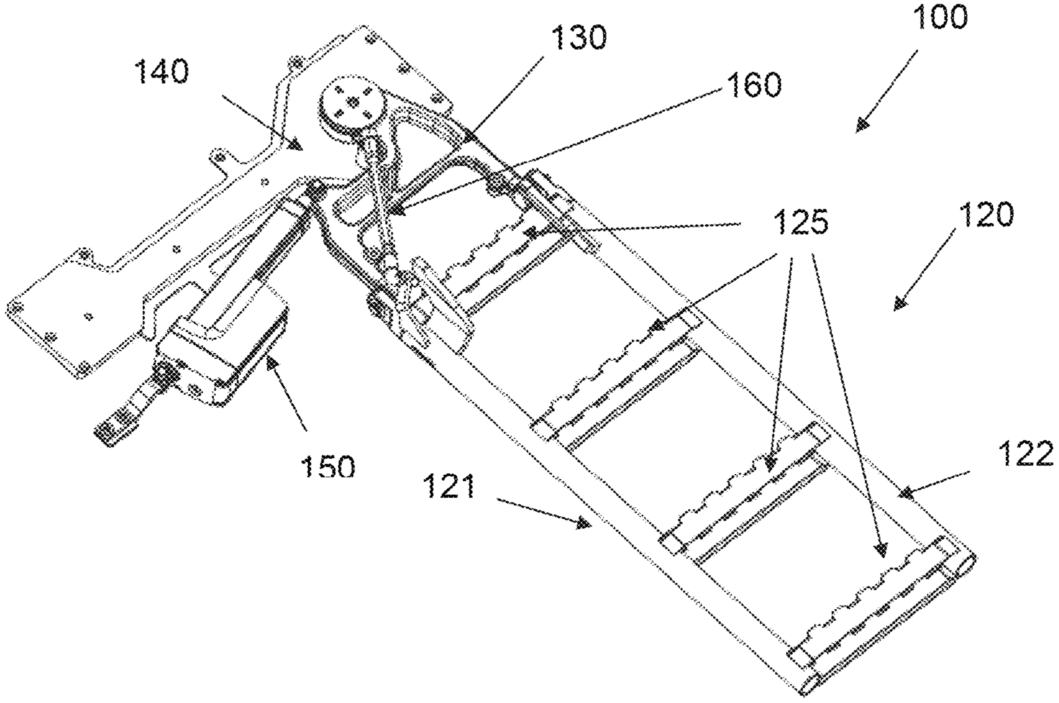
FIG. 2A is a perspective view of a further embodiment of a stair system according to the disclosure from a bottom side.

FIG. 2A is a perspective view of a further embodiment of a stair system 100 according to the disclosure from a bottom side. The stair system 100 resembles the stair system 100 of FIGS. 1A and 1B, thus merely the further details not shown in FIGS. 1A and 1B are described in the following. The foldable ladder 120 comprises two ladder stringers 121, 122 with four steps 125. The ladder stringers 121, 122 are pivotably connected to the bearing fork 130. The bearing fork is pivotably connected to a main bracket 140 of a respective working machine. The foldable ladder is driven for fold in and fold out via an electrical linear actuator 150 together with a coupling rod 160. The actuator 150 is for folding out pulling out and the bearing fork 130 is then turned clockwise (view from the bottom side). Due to the non-coaxiality of the pivot points of the bearing fork and the coupling rod 160, the distance of the coupling rod is shortened, rotating around its pivot point. Therefore the ladder stringers fixed at the bearing fork, and connected to the coupling rod are subject to a tilting movement and able to reach its end point in the lower end position in a helical movement.

Figure 2B:
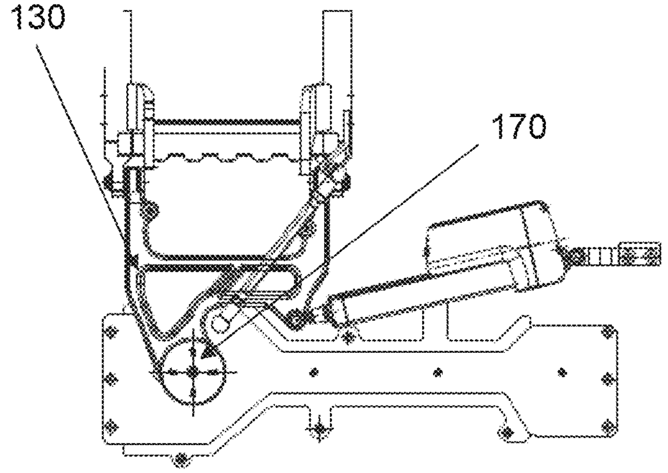
FIG. 2B is a further perspective view of the embodiment of FIG. 2A.
Figure 2C:
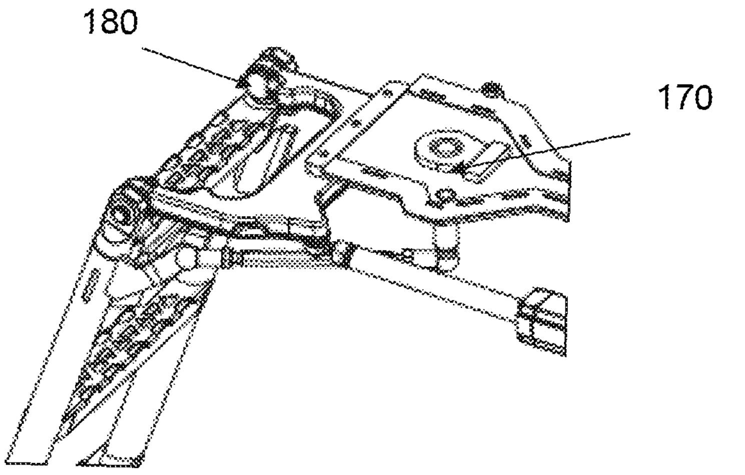
FIG. 2C is a further perspective view of the embodiment of FIG. 2A from above with the foldable ladder in a lower end position.

FIG. 2B is a further perspective view of the embodiment of FIG. 2A. Herein a first centre of rotation 170 around which the bearing fork 130 and with the bearing fork also the ladder stringers rotate to swivel out. FIG. 2C is a further perspective view of the embodiment of FIG. 2A from above with the foldable ladder in a lower end position. Herein a second centre of rotation 180 is shown around which the ladder stringers move to tilt down or up.

Figure 3A:
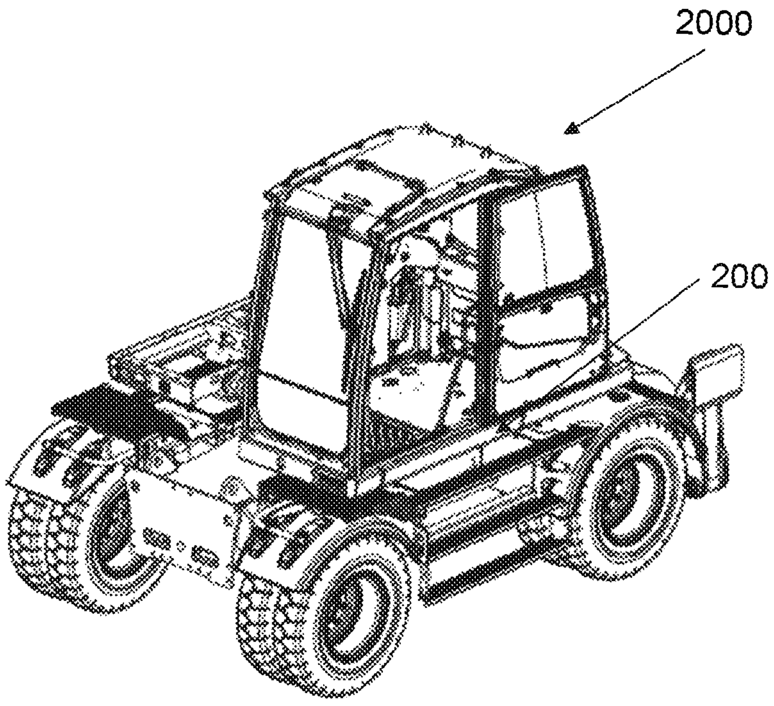
FIG. 3A is a perspective view of a working machine with a further embodiment of a stair system according to the disclosure.

FIG. 3A is a perspective view of a working machine 2000 with a further embodiment of a stair system 200 according to the disclosure. The foldable ladder 220 is in the shown state in its upper end position. The foldable ladder 220 is in a horizontal position and does not protrude from the working machine.

Figure 3B:
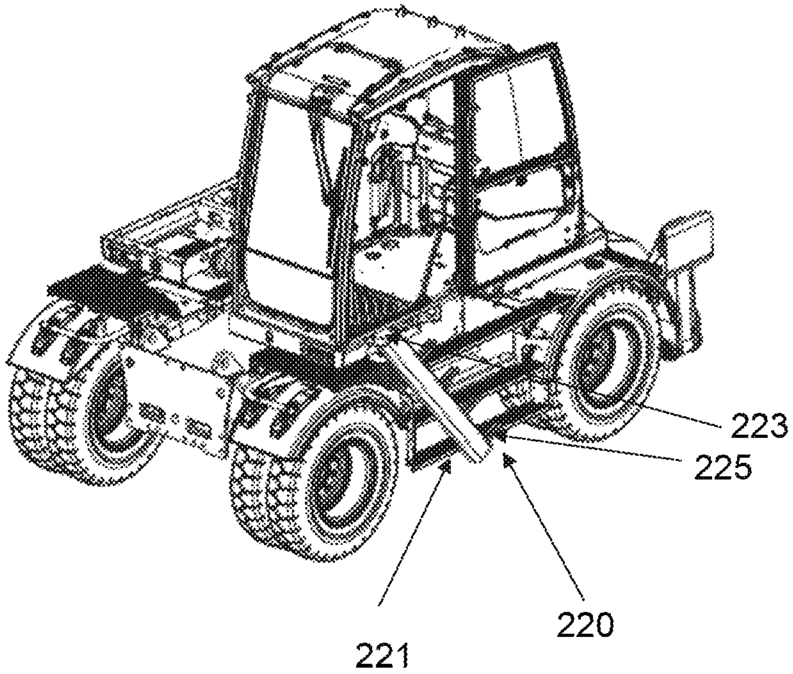
FIG. 3B is a further perspective view of the working machine of FIG. 3A.
Figure 3C:
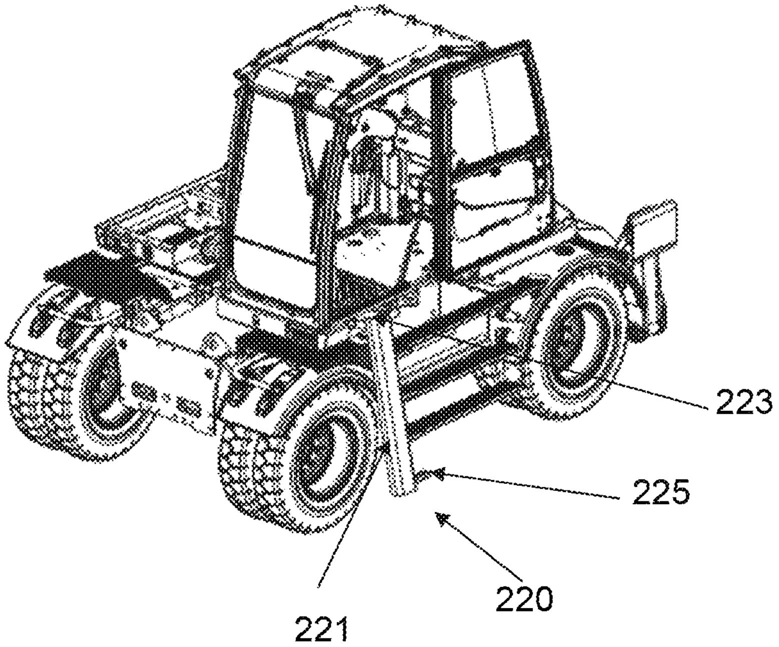
FIG. 3C is a further perspective view of the working machine of FIG. 3A.

FIG. 3B is a further perspective view of the working machine of FIG. 3A with foldable ladder 220 in an in-between position between the upper end position (FIG. 3A) and the lower end position (FIG. 3C). The ladder stringer 221 is pivotably connected to the working machine 2000 via a hinge 223. In the shown embodiment the ladder has foldable steps 225. The foldable steps 225 are in the shown embodiment automatically fold out and in during the movement of the ladder stringer.

FIG. 3C is a further perspective view of the working machine of FIG. 3A and shows the working machine 2000 with the stair system 200 in the lower end position, where the ladder provides easy and safe access to the cabin of the working machine.

Figure 3D:
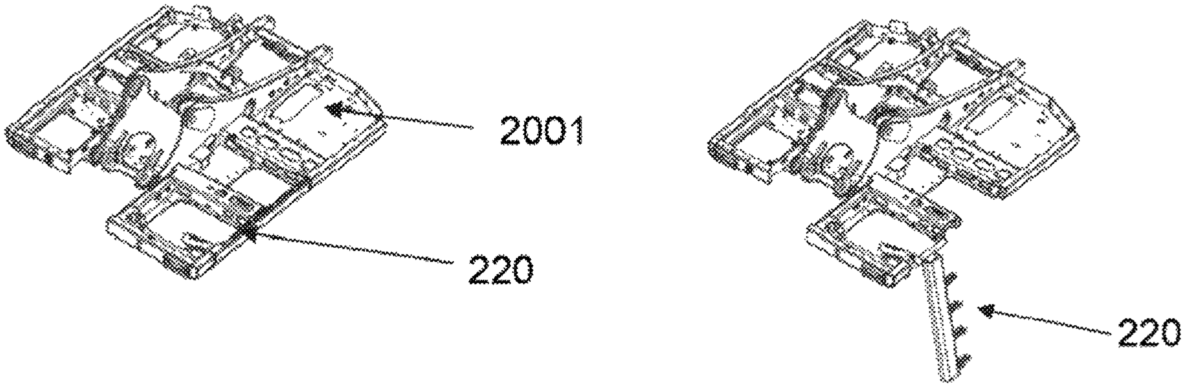
FIG. 3D shows two detailed views of the stair system of FIG. 3A.

FIG. 3D shows two detailed views of the stair system of FIG. 3A showing the foldable ladder 220 in the upper end position (left) and in the lower end position (right). In the upper end position the ladder is completely arranged within a platform 2001 of the upper carriage. In the lower end position the ladder has an angle in the range of 10 to 30° to a vertical direction of the working machine.

Figure 4:
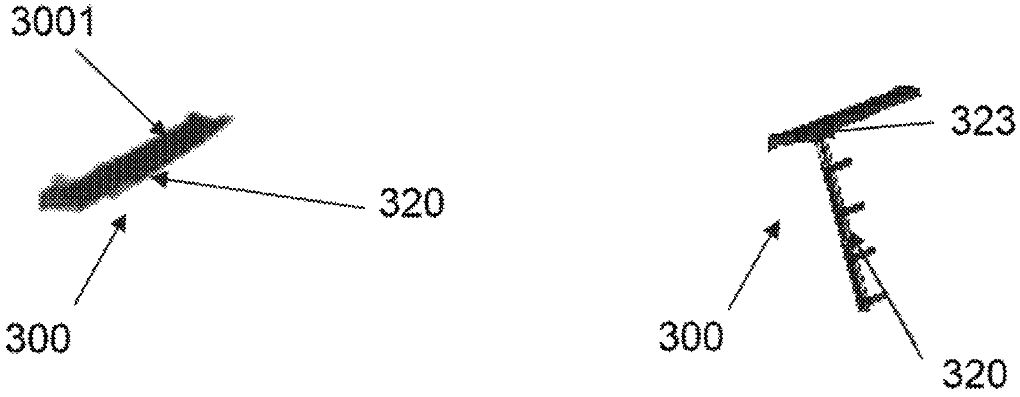
FIG. 4 is a perspective view of a further embodiment of a stair system.

FIG. 4 is a perspective view of a further embodiment of a stair system 300 showing the foldable ladder 320 in the upper end position (left) and in the lower end position (right). The stair system itself is constructed and functions as the one shown in FIG. 3A to 3D. The main difference is that the stair system 300 is pivotably connected to a footstep 3001 of the working machine via a hinge 323. In the upper end position the foldable ladder 320 is arranged below of the footstep. In further embodiments the foldable ladder may also be arranged at a side of the footstep.

REFERENCE SIGNS

100 stair system
120 foldable ladder
121 ladder stringer
122 ladder stringer
125 step
130 bearing fork
140 main bracket
150 actuator
160 coupling rod
170 centre of rotation
180 centre of rotation
200 stair system
220 foldable ladder
221 ladder stringer
223 hinge
225 foldable steps
300 stair system
320 foldable ladder
323 hinge
1000 excavator
1100 upper carriage
1110 lower carriage
1200 lower end position
1300 upper end position
2000 working machine
2001 platform
3001 footstep

The invention claimed is:

1. A stair system for a working machine having an upper carriage and a lower carriage pivotable against each other comprising:

a foldable ladder movable between an upper end position and a lower end position, wherein in the upper end position the ladder is arrangeable at the working machine in a way that moving and pivoting of the working machine is not disturbed and wherein in the lower end position the ladder is able to provide access to the upper carriage of the working machine; and a control system comprising at least one alignment sensor indicating alignment of the upper and lower carriage;

a controller which is able to block or enable a movement of the foldable ladder based on an output of the alignment sensor.

2. A stair system according to claim 1, wherein the upper end position is between the upper and lower carriage.

3. A stair system according to claim 1, wherein the foldable ladder is arranged in horizontal position in the upper end position.

4. A stair system according to claim 1, wherein in the lower end position the ladder has an angle in the range of 10° to 30° to a vertical direction of the working machine and/or wherein a turning radius of the ladder is not larger than a turning radius of a door of the working machine.

5. A stair system according to claim 1, wherein one ladder stringer is pivotably connectable to the working machine via a hinge.

6. A stair system according to claim 1, wherein the foldable ladder comprises a folding construction having two centres of rotation.

7. A stair system according to claim 6, wherein the foldable ladder comprises a bearing fork which is pivotably connectable to the working machine and at which two ladder stringers are pivotably arranged, wherein the bearing fork is pivotably connectable to a main bracket of the working machine.

8. A stair system according to claim 1, wherein the foldable ladder is arranged and constructed to be moved manually.

9. A stair system according to claim 1, further comprising at least one movement sensor detecting a moving state of the working machine and/or at least one position sensor detecting a position of the foldable ladder and/or at least one surveillance sensor for space surveillance of a range of motion of the foldable ladder, wherein the controller is further able to block or enable a movement of the foldable ladder and/or the working machine based on an output of the movement sensor and/or the at least one position sensor and/or the at least one surveillance sensor.

10. A stair system according to claim 1, wherein the stair system is an automatic stair system with a ladder drive system comprising at least one electrical or hydraulic, linearly extending, actuator and a coupling rod driving the foldable ladder.

11. A stair system according to claim 10, wherein the control system comprises at least two control elements to activate the ladder drive system, of which a first control element is arranged at a cabin of the working machine and a second control element is arranged to be reachable from the ground.

12. A stair system according to claim 1, wherein the control system comprises a warning unit, which is able to output a warning signal to an operator if a movement of the foldable ladder and/or the working machine is blocked or enabled by the control system, wherein the warning signal differs depending on the sensor output leading to the block of the respective movement.

13. A stair system according to claim 10, further comprising an actuator sensor for a status of the electrical or hydraulic actuator and wherein the control system is further able to block or enable a movement of the foldable ladder based on an output of the actuator sensor.

14. A working machine having an upper and a lower carriage pivotable against each other with a stair system according claim 1.

15. A working machine according to claim 14, wherein the working machine is an excavator, a truck crane or a harvester.

* * * * *